US011498428B2

(12) United States Patent
Kuras et al.

(10) Patent No.: US 11,498,428 B2
(45) Date of Patent: Nov. 15, 2022

(54) DIRECTIONAL SHIFT VARIABLE BRAKE DISENGAGEMENT

(71) Applicant: Caterpillar Inc., Peoria, IL (US)

(72) Inventors: Brian Kuras, East Peoria, IL (US); Ankit Sharma, Peoria, IL (US); Lance Cowper, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 435 days.

(21) Appl. No.: 16/666,148

(22) Filed: Oct. 28, 2019

(65) Prior Publication Data

US 2021/0122247 A1 Apr. 29, 2021

(51) Int. Cl.
| | | |
|---|---|---|
| *B60W 30/14* | (2006.01) | |
| *B60L 7/26* | (2006.01) | |
| *B60L 15/20* | (2006.01) | |
| *B60W 30/18* | (2012.01) | |
| *B60L 7/18* | (2006.01) | |

(52) U.S. Cl.
CPC ............. *B60L 7/26* (2013.01); *B60L 15/2009* (2013.01); *B60L 7/18* (2013.01); *B60L 2240/461* (2013.01); *B60T 2270/604* (2013.01); *B60W 30/18127* (2013.01)

(58) Field of Classification Search
CPC ...... B60W 10/02; B60W 10/10; B60W 10/11; B60W 10/18; B60W 10/184; B60W 30/18; B60W 30/143; B60L 7/18; B60L 7/26
USPC .............. 192/219, 221; 477/71–77, 172, 175
See application file for complete search history.

(56) References Cited

U.S. PATENT DOCUMENTS

| | | | | |
|---|---|---|---|---|
| 4,248,330 A | * | 2/1981 | Audiffred, Jr. ..... | B60W 10/184 192/221 |
| 4,543,786 A | * | 10/1985 | Shuler ................... | B60T 13/585 60/435 |
| 4,768,636 A | * | 9/1988 | Ito ......................... | B60W 10/02 414/469 |
| 6,019,202 A | * | 2/2000 | Anwar ................. | B60W 10/02 74/731.1 |
| 7,037,236 B2 | | 5/2006 | Ishibashi | |
| 7,097,021 B2 | * | 8/2006 | Takamura ......... | B60W 30/1819 192/221 |
| 7,448,471 B2 | | 11/2008 | Nuebling | |
| 8,521,391 B2 | | 8/2013 | Krueger et al. | |
| 8,523,297 B2 | | 9/2013 | Morishita | |
| 8,998,352 B2 | | 4/2015 | Imamura | |
| 9,545,925 B1 | * | 1/2017 | Guldan ................. | B60W 10/02 |
| 10,518,779 B2 | * | 12/2019 | Awana .................. | B60W 10/10 |
| 2009/0037047 A1 | | 2/2009 | Hawkins | |

(Continued)

FOREIGN PATENT DOCUMENTS

WO 2018/085324 A1 5/2018

*Primary Examiner* — Christopher P Schwartz
(74) *Attorney, Agent, or Firm* — Harrity & Harrity, LLP

(57) ABSTRACT

A braking system is disclosed. The braking system may include a controller configured to determine a speed threshold that is based on a deceleration of an output speed of a powertrain of a machine caused in part by engagement of one or more brakes of the machine during a directional shift in a movement of the machine, the speed threshold being the output speed of the powertrain at which the one or more brakes are to be commanded to disengage. The controller may be configured to command disengagement of the one or more brakes based on a determination that the output speed of the powertrain satisfies the speed threshold.

20 Claims, 4 Drawing Sheets

(56) References Cited

U.S. PATENT DOCUMENTS

| | | | |
|---|---|---|---|
| 2012/0271493 A1 | 10/2012 | Gratton | |
| 2013/0304340 A1* | 11/2013 | Shattuck | B60W 30/18009 |
| | | | 701/68 |
| 2014/0100727 A1 | 4/2014 | Pietron | |
| 2015/0158492 A1 | 6/2015 | Bulgrien | |
| 2017/0057476 A1* | 3/2017 | Schwartz | B60T 8/172 |
| 2017/0113700 A1 | 4/2017 | Kaneko et al. | |
| 2019/0351904 A1* | 11/2019 | Anderson | B60T 7/12 |
| 2020/0377099 A1* | 12/2020 | Anderson | B60W 30/18063 |
| 2021/0370942 A1* | 12/2021 | Thompson | B60W 10/06 |

* cited by examiner

DIRECTIONAL SHIFT VARIABLE BRAKE DISENGAGEMENT

TECHNICAL FIELD

The present disclosure relates generally to a braking system for a machine and, for example, to variable brake disengagement during a directional shift of the machine.

BACKGROUND

Electro-hydraulic brake valves may be used in machines, such as track-type tractors and other types of earth-moving machines, to apply and release braking devices. Electronic controllers may control the brake valves by transmitting brake command currents to a brake valve in response to detecting actuation or release of a braking control device by an operator of the machine. The brake valve responds to the brake command currents by changing the pressure within the braking device to tighten or loosen the braking device as commanded. However, in some cases, there may be a time delay between issuance of the brake command and the braking device effectuating the commanded braking. For example, a time delay associated with movement of hydraulic fluid through the brake valve and associated hydraulic passages may occur after a command to disengage the braking device.

During a directional shift of the machine (e.g., from forward to reverse or reverse to forward), brake command currents commanding engagement of the braking device may be automatically transmitted in order to slow the machine for a change to a new direction, and at a preset, fixed speed, brake command currents commanding disengagement of the braking device may be automatically transmitted to permit movement of the machine in the new direction. However, due to a time delay (e.g., a variable time delay) associated with disengaging the braking device, as well as the particular rate at which the machine is decelerating in order to effectuate the directional shift, a brake command at the fixed speed may result in disengagement of the braking device too soon or too late. Disengagement that occurs too soon may cause a decrease in the rate of deceleration, which may be unsettling to the operator of the machine and prolong the directional shift. Disengagement that occurs too late may cause the machine to hesitate at zero speed, thereby preventing the machine from moving in the new direction.

One attempt at a control device for an industrial vehicle that generates no speed change shock when the traveling direction is switched to the opposite direction is disclosed in U.S. Pat. No. 7,097,021 that issued to Takamura et al. on Aug. 29, 2006 ("the '021 patent"). In particular, the '021 patent discloses that when a traveling direction is switched during the running of a vehicle, the vehicle is first gradually decelerated by a braking applied by brakes. The '021 patent further discloses that when the vehicle speed drops below a specified speed, the braking force of the brakes and engine braking torque created by engagement of a forward clutch or reverse clutch of a transmission corresponding to the selected traveling direction are both controlled before the vehicle speed reaches zero. The '021 patent indicates that, as a result, the deceleration torque prior to the reversal of direction and the acceleration torque following the reversal of direction are controlled to substantially constant values so that the fluctuations in acceleration around the point of time at which the traveling direction is reversed are reduced.

While the control device of the '021 patent may address speed change shock when the traveling direction of a vehicle is switched, the '021 patent does not address a brake disengagement occurring too soon or too late as a result of a time delay associated with disengaging a brake. For example, the '021 patent does not address issues associated with brake disengagement being commanded at a fixed speed, which does not account for a time delay (e.g., a variable time delay) associated with disengaging a braking device and/or a particular rate of deceleration of a machine performing a directional shift.

The braking system of the present disclosure solves one or more of the problems set forth above and/or other problems in the art.

SUMMARY

According to some implementations, a method may include determining a speed threshold that is based on a deceleration of an output speed of a powertrain of a machine caused in part by engagement of one or more brakes of the machine during a directional shift in a movement of the machine, the speed threshold being the output speed of the powertrain at which the one or more brakes are to be commanded to disengage, and commanding disengagement of the one or more brakes based on a determination that the output speed of the powertrain satisfies the speed threshold.

According to some implementations, a braking system may include one or more brakes, and a controller configured to: identify a command that is to cause a directional shift; determine, based on identifying the command, a speed threshold that is based on a deceleration of an output speed of a powertrain caused in part by engagement of the one or more brakes during the directional shift, the speed threshold being the output speed of the powertrain at which the one or more brakes are to be commanded to disengage; and command disengagement of the one or more brakes based on a determination that the output speed of the powertrain satisfies the speed threshold.

According to some implementations, a machine may include a powertrain, one or more brakes, and a controller configured to: determine a speed threshold that is based on a deceleration of an output speed of the powertrain, caused in part by engagement of the one or more brakes during a directional shift in a movement of the machine, and a time delay between a braking command and a corresponding disengagement of the one or more brakes, the speed threshold being the output speed of the powertrain at which the one or more brakes of the machine are to be commanded to disengage; and command disengagement of the one or more brakes based on a determination that the output speed of the powertrain satisfies the speed threshold.

DETAILED DESCRIPTION

Figure 1:
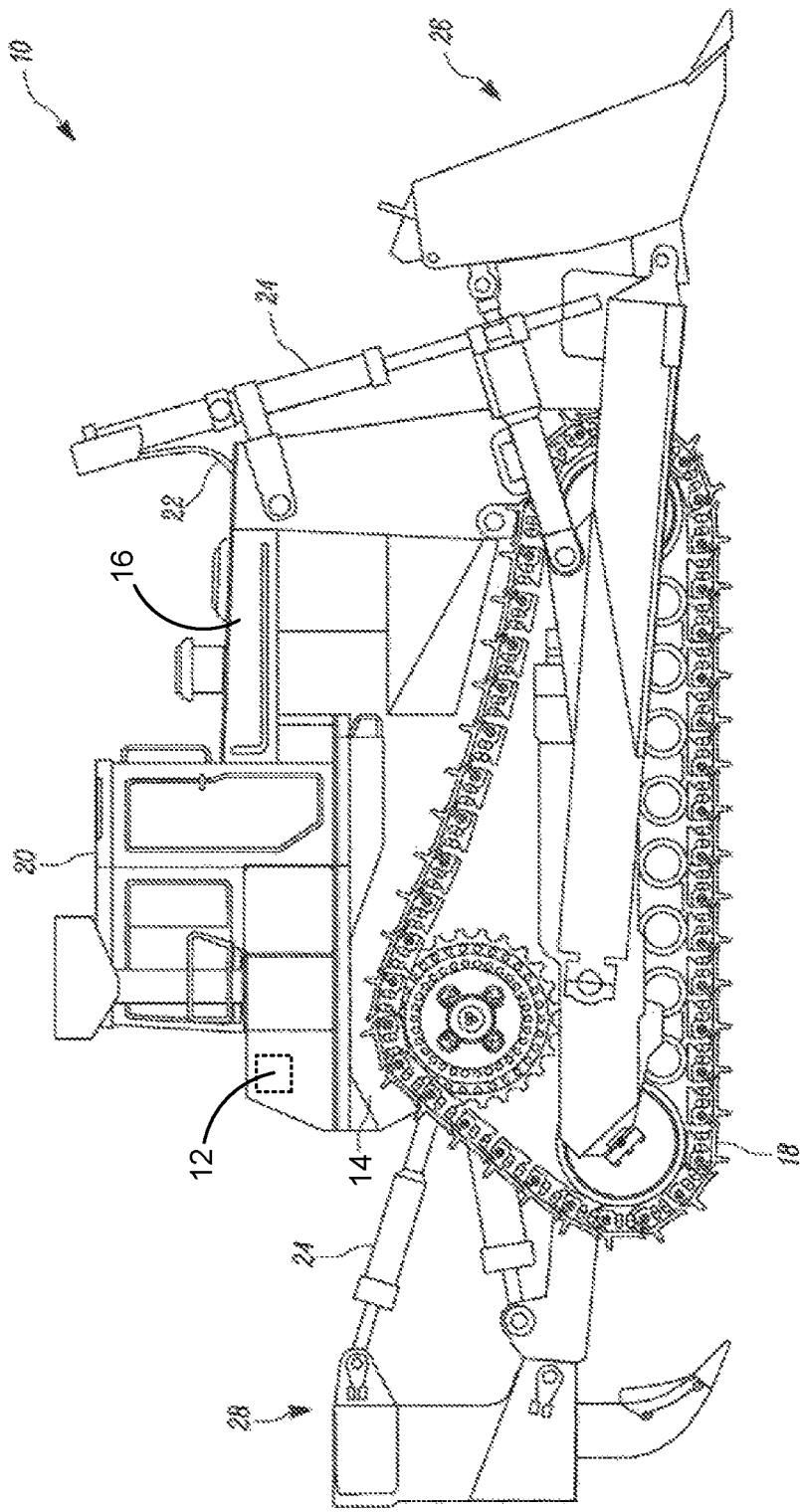
FIG. 1 is diagram of an example machine described herein.

FIG. 1 is a diagram of an example machine 10 that includes a controller 12. As shown in FIG. 1, the machine 10 is embodied as a track type machine, such as a track type tractor. Alternatively, the machine 10 may be a backhoe loader, a skid steer loader, a wheel loader, a motor grader, an excavator, a scraper, an agricultural tractor, a haul truck, or the like.

As shown in FIG. 1, the machine 10 may include a frame assembly 14 and a power source 16. The power source 16 may include one or more batteries, one or more engines (e.g., diesel engines), one or more generators, and/or the like, configured to provide power to the machine 10. For example, the power source 16 may provide power to a powertrain (not shown in FIG. 1) of the machine 10, which may include a motor (e.g., an electric motor), a transmission (e.g., an electric transmission, a hydraulic transmission, a mechanical transmission, a continuously variable transmission, and/or the like), and/or the like. The powertrain may be associated with an electric drive system of the machine 10 or a continuously variable transmission of the machine 10.

The machine 10 may also include a set of ground engaging members 18, such as wheels, tracks, rollers, or the like, for propelling the machine 10. Furthermore, the machine 10 may include an operator cabin 20, which may include one or more input devices (not shown in FIG. 1), such as one or more push-buttons, control levers, steering wheels, or the like, for controlling and/or monitoring operations of the machine 10.

In some implementations, the machine 10 may include a hydraulic pump (not shown). The hydraulic pump may be operatively coupled to the power source 16 to provide pressurized hydraulic fluid via hoses 22 to hydraulic cylinders 24 for moving tools and implements of the machine 10, such as front attachment 26 and/or a rear attachment 28. The front attachment 26 may include a blade assembly, and/or the like. The rear attachment 28 may include a ripper assembly, a winch assembly, a drawbar assembly, and/or the like.

Moreover, the machine 10 may include a braking system (not shown in FIG. 1) configured to slow and/or arrest a movement of the machine 10. The braking system may include one or more brakes, such as electro-hydraulic brakes. An electro-hydraulic brake may include an electro-hydraulic brake valve and a braking device that is controlled by the electro-hydraulic brake valve. For example, the electro-hydraulic brake valve may control a pressure that a hydraulic fluid exerts on a piston that controls engagement and disengagement of the braking device.

The controller 12 (e.g., an electronic control module (ECM)) may include one or more memories and one or more processors that implement operations associated with variable brake disengagement during a directional shift of the machine 10, as described below in connection with FIG. 2. For example, the controller 12 may be configured to identify a command that is to cause a directional shift of the machine 10, determine, based on identifying the command, a speed threshold that is based on a deceleration of the powertrain caused in part by engagement of the brakes and/or retarding of the powertrain during the directional shift, and command disengagement of the brakes based on a determination that the output speed of the powertrain satisfies the speed threshold.

A directional shift may refer to a procedure in which a direction of movement of the machine 10 is changed from a forward direction to a reverse direction or from a reverse direction to a forward direction (e.g., via the powertrain of the machine 10, such as via a transmission of the machine 10). Accordingly, the directional shift may begin when movement in an opposite direction from a current direction of movement is commanded, and may conclude when movement in the opposite direction commences.

As indicated above, FIG. 1 is provided as an example. Other examples may differ from what is described in connection with FIG. 1.

Figure 2:
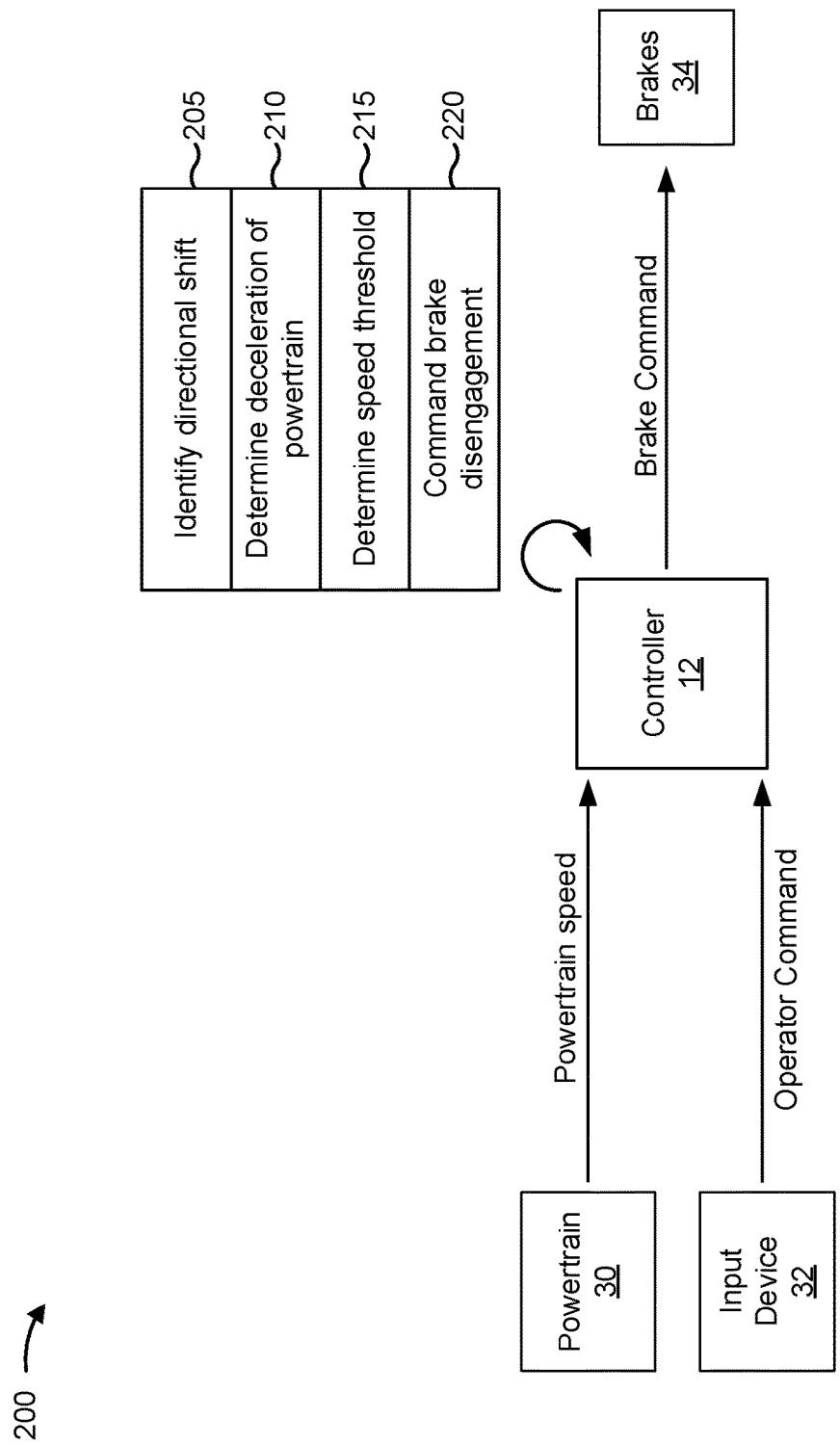
FIG. 2 is diagram of an example implementation described herein.

FIG. 2 is a diagram of an example implementation 200 described herein. As shown in FIG. 2, example implementation 200 may relate to a braking system of machine 10 that includes a controller 12, a powertrain 30, an input device 32, and one or more brakes 34, as described above in connection with FIG. 1. For example, the brakes 34 may be electro-hydraulic brakes associated with a time delay between a command to disengage the brakes 34 and a corresponding disengagement of the brakes 34. The powertrain 30 may include a motor (e.g., an electric motor), a transmission (e.g., an electric transmission, a hydraulic transmission, a mechanical transmission, a continuously variable transmission, and/or the like), and/or the like.

As shown in FIG. 2, the controller 12 may receive information relating to a speed (e.g., an output speed) of the powertrain 30. The information relating to the speed of the powertrain 30 may include a revolutions per minute (RPM) of the powertrain 30. The speed of the powertrain 30 may be associated with a speed (e.g., RPM) of a motor of the powertrain 30, an output speed (e.g., RPM) of a transmission of the powertrain 30, and/or the like. In addition, the controller 12 may receive information relating to one or more operator commands provided by an operator of the machine 10 (e.g., via the input device 32). The one or more operator commands may relate to a directional shift of the machine 10.

As shown in FIG. 2, and by reference number 205, the controller 12 may identify a directional shift of the machine 10. That is, the controller 12 may identify that the machine 10 is to perform a directional shift. The controller 12 may identify the directional shift of the machine 10 based on one or more operator commands received by the controller 12 (e.g., via the input device 32). For example, an operator command may command a forward speed of the machine 10 followed by an operator command that commands a reverse speed of the machine 10, thereby enabling the controller 12 to determine a directional shift. Other operator commands may additionally, or alternatively, indicate a directional shift of the machine 10.

Based on identifying the directional shift, the controller 12 may command engagement of the brakes 34 and/or command retarding of the powertrain 30 (e.g., retarding of a motor, a transmission, and/or the like) to effectuate the directional shift. For example, engagement of the brakes 34 and/or retarding of the powertrain 30 may cause deceleration of the machine 10, and a corresponding deceleration of the speed of the powertrain 30, to enable a change in direction according to the directional shift. The controller 12 may maintain engagement of the brakes 34 during the directional shift until a speed of the powertrain 30 (e.g., a speed of a motor, a transmission, and/or the like) satisfies a speed threshold, at which time the controller may command disengagement of the brakes 34. As described below, the speed threshold may be based on a deceleration of the powertrain 30 (e.g., a deceleration of a motor, a transmission, and/or the like), and therefore may be variable.

As shown by reference number 210, the controller 12 may determine (e.g., during the directional shift) the deceleration of the powertrain 30. For example, the controller 12 may determine the deceleration (e.g., RPM/second) of the powertrain 30 based on information relating to a speed (e.g., RPM) of the powertrain 30 (e.g., a speed of a motor, a transmission, and/or the like), as described above. The controller 12 may receive the information relating to the speed of the powertrain 30 from a speed sensor associated with the powertrain 30 (e.g., associated with a motor, a transmission, and/or the like). Based on the speed of the powertrain 30, the controller 12 may determine the deceleration of the powertrain 30 as a derivative of the speed of the powertrain 30 with respect to time. In some implementations, the controller 12 may process the determined derivative with one or more filters and/or one or more other signal processing techniques to determine the deceleration. For example, the controller 12 may process the determined derivative with one or more filters to remove noise or perform saturation of a magnitude of the derivative to remove noise.

As shown by reference number 215, the controller 12 may determine (e.g., during the directional shift) a speed threshold that represents a speed (e.g., an output speed) of the powertrain 30 (e.g., a speed of a motor, a transmission, and/or the like) at which the brakes 34 are to be commanded to disengage. The speed threshold may be based on the determined deceleration of the powertrain 30. In other words, the controller 12 may determine the speed threshold as a function of the deceleration of the powertrain 30. Accordingly, the speed threshold may be variable on a case-by-case basis due to variations in the deceleration of the powertrain 30.

In addition, the speed threshold may also be based on a time delay between a command to disengage the brakes 34 and a corresponding disengagement of the brakes 34. That is, a time delay between a first time when the controller 12 transmits a command to disengage the brakes 34 and a second time when the brakes 34 disengage in response to the command. In such cases, the controller 12 may determine the speed threshold as a product of the deceleration and the time delay.

The time delay may be an estimated value that is based on one or more properties of the brakes 34, such as a temperature of a hydraulic fluid of the brakes 34 (e.g., a hydraulic fluid that causes disengagement of the brakes 34), flow characteristics of the hydraulic fluid in an electro-hydraulic brake valve of the brakes 34 (e.g., a flow capability or a flow rate of the hydraulic fluid through the electro-hydraulic brake valve), an area of a piston associated with the electro-hydraulic brake valve, an estimated amount of wear of the brakes 34 (e.g., based on an elapsed time since a prior replacement of a braking device, a distance travelled by the machine 10 since the prior replacement of the braking device, and/or the like), and/or the like. Accordingly, the estimated value for the time delay may vary with temperature and/or use of the brakes 34.

Moreover, the speed threshold may also be based on an offset value, which may be a constant value that is greater than or equal to zero. The offset value may be a speed (e.g., RPM) that is added to the speed threshold (e.g., to ensure that the speed threshold is a speed greater than zero). The offset value may compensate for delays, between a command to disengage the brakes 34 and a corresponding disengagement of the brakes 34, that are not caused by properties of the brakes 34, as described above. For example, the delays may be software delays, hardware delays, delays due to estimate errors, delays due to filtering errors, and/or the like.

As shown by reference number 220, the controller 12 may transmit (e.g., during the directional shift) a command to disengage the brakes 34 based on a determination that a speed of the powertrain 30 (e.g., a speed of a motor, a transmission, and/or the like) satisfies the speed threshold (e.g., the speed of the powertrain 30 is less than or equal to the speed threshold). For example, the controller 12 may monitor the speed of the powertrain 30 (e.g., based on information relating to the speed of the powertrain 30 that may be provided to the controller 12 by one or more speed sensors), and may transmit the command to disengage the brakes 34 when the speed of the powertrain 30 satisfies the speed threshold. In some implementations, the command may include a flag indicating that the brakes 34 are to disengage.

As indicated above, FIG. 2 is provided as an example. Other examples may differ from what was described in connection with FIG. 2.

Figure 3:
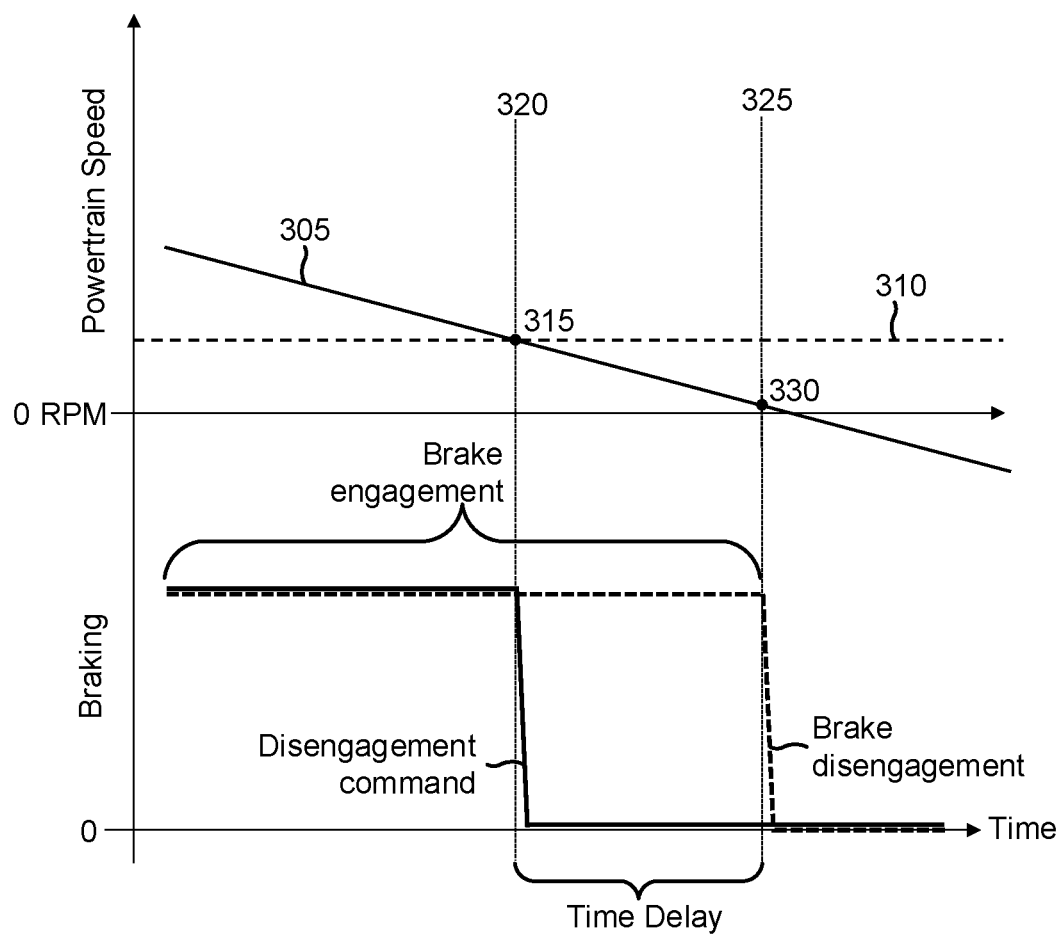
FIG. 3 is diagram of an example implementation described herein.

FIG. 3 is a diagram of an example implementation 300 described herein. In particular, FIG. 3 shows an example of brake disengagement during a directional shift of a machine (e.g., machine 10), as described elsewhere herein.

As shown in FIG. 3, and as represented by line 305, a speed of a powertrain (e.g., powertrain 30, such as a speed of a motor, a transmission, and/or the like) of the machine may begin to decline in response to a directional shift commanded by an operator of the machine. For example, as shown in FIG. 3, the deceleration of the powertrain may be caused by engagement of one or more brakes (e.g., brakes 34) and/or retarding of the powertrain (e.g., retarding of a motor, a transmission, and/or the like) of the machine in response to the commanded directional shift. As represented by line 310, a speed threshold may be determined (e.g., by a controller of the machine) based on a deceleration of the powertrain, as described above in connection with FIG. 2. The speed threshold may represent a speed (e.g., an output speed) of the powertrain at which the brakes are to be commanded to disengage.

The speed of the powertrain may decline during the directional shift until the speed of the powertrain satisfies the speed threshold, as shown at point 315. As described above in connection with FIG. 2, a controller of the machine may monitor the speed of the powertrain in order to determine when the speed of the powertrain satisfies the speed threshold.

Based on the speed of the powertrain satisfying the speed threshold, a command to disengage the brakes may be transmitted at a first time 320. For example, the controller may transmit the command to disengage the brakes. As shown in FIG. 3, a time delay may occur between the first time 320, when the command to disengage the brakes is transmitted, and a second time 325 when the brakes disengage in response to the command. However, as shown in FIG. 3, despite the time delay, the brakes disengage prior to the speed of the powertrain being zero, as shown at point 330.

As indicated above, FIG. 3 is provided as an example. Other examples may differ from what was described in connection with FIG. 3.

Figure 4:
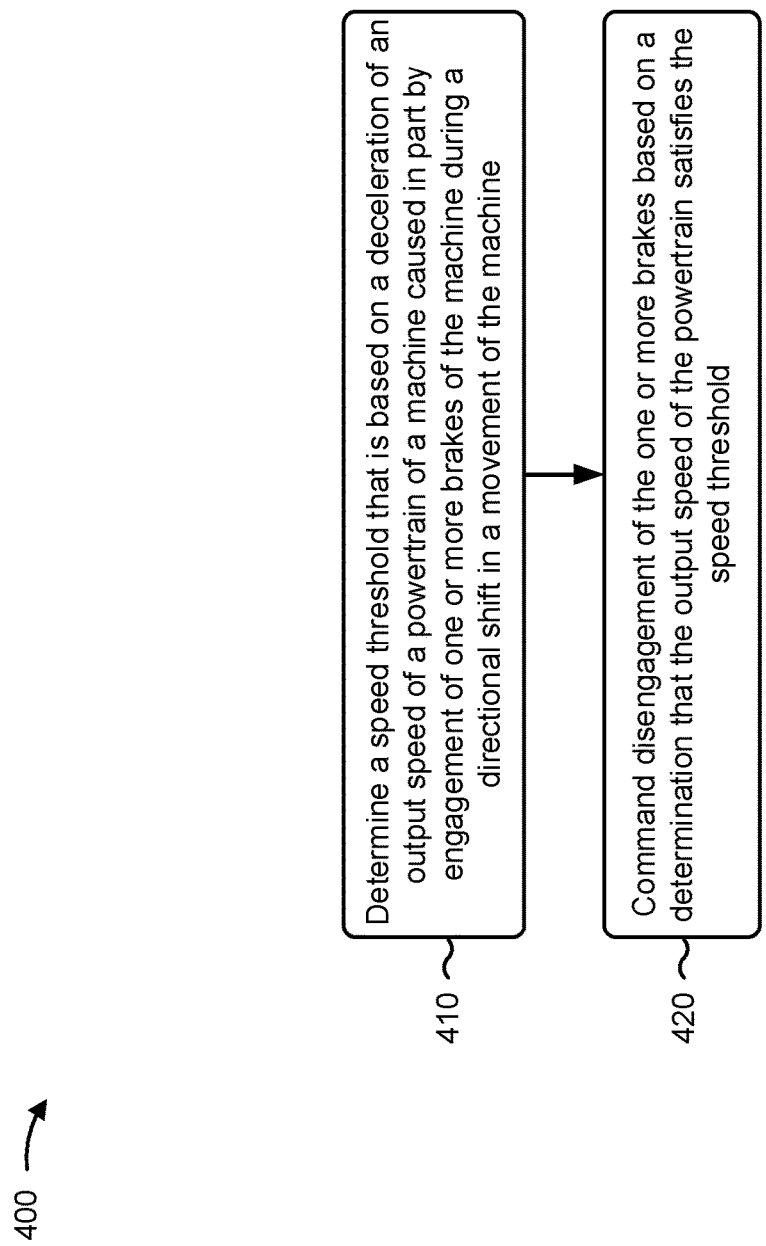
FIG. 4 is a flow chart of an example process for directional shift variable brake disengagement.

FIG. 4 is a flow chart of an example process 400 for directional shift variable brake disengagement. One or more process blocks of FIG. 4 may be performed by a controller (e.g., controller 12). Additionally, or alternatively, one or more process blocks of FIG. 4 may be performed by another device or a group of devices separate from or including the controller 12, such as another device or component that is internal or external to the machine 10.

As shown in FIG. 4, process 400 may include determining a speed threshold that is based on a deceleration of a powertrain of a machine caused in part by engagement of one or more brakes of the machine during a directional shift in a movement of the machine (block 410). For example, the controller (e.g., using a processor, a memory, a storage component, an input component, a communication interface, and/or the like) may determine a speed threshold that is based on a deceleration of a powertrain of a machine caused in part by engagement of one or more brakes of the machine during a directional shift in a movement of the machine, as described above. The output speed of the powertrain may be associated with a motor of the powertrain or a transmission of the powertrain.

In some implementations, process 400 may further include commanding the directional shift in the movement of the machine. Additionally, or alternatively, process 400 may further include identifying a command that is to cause the directional shift. The command that is to cause the directional shift may cause the engagement of the one or more brakes. In addition, process 400 may further include determining the deceleration of the output speed of the powertrain based on the output speed of the powertrain.

The speed threshold may be the output speed of the powertrain at which the one or more brakes are to be commanded to disengage. Furthermore, the speed threshold may be based on the deceleration of the output speed of the powertrain and a time delay between a braking command and a corresponding disengagement of the one or more brakes. For example, the speed threshold may be a product of the deceleration of the output speed and the time delay. The time delay may be an estimated value that is based on a temperature of a hydraulic fluid that causes the corresponding disengagement of the one or more brakes. The estimated value may be further based on at least one of flow characteristics of the hydraulic fluid in a valve of the one or more brakes or an estimated amount of wear of the one or more brakes. Moreover, the speed threshold may be further based on an offset value, as described above.

As further shown in FIG. 4, process 400 may include commanding disengagement of the one or more brakes based on a determination that the output speed of the powertrain satisfies the speed threshold (block 420). For example, the controller (e.g., using a processor, a memory, an output component, a communication interface, and/or the like) may command disengagement of the one or more brakes based on a determination that the output speed of the powertrain satisfies the speed threshold, as described above.

In some implementations, process 400 may further include monitoring the output speed of the powertrain in order to determine whether the output speed of the powertrain satisfies the speed threshold. In addition, commanding the disengagement of the one or more brakes may cause the one or more brakes to disengage prior to the output speed of the powertrain being zero. The one or more brakes may be electro-hydraulic brakes, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed braking system may be used with any machine for which improved performance during a directional shift is desired. In particular, the disclosed braking system may enable disengagement of a brake of the machine close to, but before, a speed of the machine reaches zero. In this way, the machine may have smooth deceleration during a directional shift without sudden losses of deceleration, which are unsettling to an operator and prolong the directional shift, and which may otherwise occur due to early disengagement of the brakes. Moreover, the machine may change directions during a directional shift without prolonged delay at zero speed, which may otherwise occur due to late disengagement of the brakes.

What is claimed is:

1. A method, comprising:
    determining a deceleration, of a powertrain of a machine, that is caused in part by engagement of one or more brakes of the machine during a directional shift of the machine;
    determining a speed threshold based on the deceleration, the speed threshold being an output speed of the powertrain at which the one or more brakes are to be commanded to disengage; and
    commanding disengagement of the one or more brakes based on the speed threshold.

2. The method of claim 1, wherein commanding the disengagement of the one or more brakes causes the one or more brakes to disengage prior to the output speed of the powertrain being zero.

3. The method of claim 1, wherein the one or more brakes are electro-hydraulic brakes.

4. The method of claim 1, wherein the speed threshold is determined further based on a time delay between a braking command and a corresponding disengagement of the one or more brakes.

5. The method of claim 1, wherein the output speed of the powertrain is associated with a motor of the powertrain or a transmission of the powertrain.

6. The method of claim 4, wherein the time delay is an estimated value that is based on a temperature of a hydraulic fluid that causes the corresponding disengagement of the one or more brakes.

7. A braking system, comprising:
    one or more brakes; and
    a controller configured to:
        identify a command that is to cause a directional shift;
        determine, based on identifying the command, a speed threshold that is based on a deceleration of a powertrain caused in part by engagement of the one or more brakes during the directional shift,
            the speed threshold being an output speed of the powertrain at which the one or more brakes are to be commanded to disengage; and
        command disengagement of the one or more brakes based on the speed threshold.

8. The braking system of claim 7, wherein commanding the disengagement of the one or more brakes causes the one or more brakes to disengage prior to the output speed of the powertrain being zero.

9. The braking system of claim 7, wherein the command that is to cause the directional shift causes the engagement of the one or more brakes.

10. The braking system of claim 7, wherein the controller is further configured to monitor the output speed of the powertrain in order to determine whether the output speed of the powertrain satisfies the speed threshold, and
    wherein the one or more brakes are commanded to be disengaged based on the output speed of the powertrain satisfying the speed threshold.

11. The braking system of claim 7, wherein the speed threshold is determined further based on a time delay between a braking command and a corresponding disengagement of the one or more brakes.

12. The braking system of claim 7, wherein the output speed of the powertrain is associated with a motor of the powertrain or a transmission of the powertrain.

13. The braking system of claim 7, wherein the controller is further configured to determine the deceleration of the powertrain based on the output speed of the powertrain.

14. A machine, comprising:
a powertrain;
one or more brakes; and
a controller configured to:
   determine a speed threshold that is based on a deceleration of the powertrain and a time delay,
      the deceleration being caused in part by engagement of the one or more brakes during a directional shift in a movement of the machine,
      the time delay being between a braking command and a corresponding disengagement of the one or more brakes, and
      the speed threshold being an output speed of the powertrain at which the one or more brakes of the machine are to be commanded to disengage; and
   command disengagement of the one or more brakes based on the speed threshold.

15. The machine of claim 14, wherein commanding the disengagement of the one or more brakes causes the one or more brakes to disengage prior to the output speed of the powertrain being zero.

16. The machine of claim 14, wherein the one or more brakes are electro-hydraulic brakes.

17. The machine of claim 14, wherein the controller is further configured to command the directional shift in the movement of the machine.

18. The machine of claim 14, wherein the output speed of the powertrain is associated with a motor of the powertrain or a transmission of the powertrain.

19. The machine of claim 14, wherein the time delay is an estimated value that is based on a temperature of a hydraulic fluid that causes the corresponding disengagement of the one or more brakes.

20. The machine of claim 19, wherein the estimated value is further based on at least one of flow characteristics of the hydraulic fluid in a valve of the one or more brakes or an estimated amount of wear of the one or more brakes.

* * * * *